United States Patent
Dean, Jr. et al.

(10) Patent No.: US 6,786,650 B2
(45) Date of Patent: Sep. 7, 2004

(54) METHOD AND APPARATUS FOR ANALYZING THE END FACE OF A MULTIFIBER FERRULE

(75) Inventors: David L. Dean, Jr., Hickory, NC (US); Darrell R. Childers, Hickory, NC (US); James P. Luther, Hickory, NC (US); Terry L. Cooke, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/702,816

(22) Filed: Nov. 6, 2003

(65) Prior Publication Data

US 2004/0101255 A1 May 27, 2004

Related U.S. Application Data

(62) Division of application No. 09/318,100, filed on May 25, 1999, now Pat. No. 6,705,767.

(51) Int. Cl.[7] .................................................. G02B 6/36
(52) U.S. Cl. ........................................ 385/85; 385/147
(58) Field of Search ............................... 385/53, 56, 60, 385/70–78, 85, 147; 356/450, 477, 511, 73.1

(56) References Cited

U.S. PATENT DOCUMENTS 5,459,564 A    10/1995  Chivers ..................... 356/73.1
5,636,020 A  * 6/1997  Csipkes et al. ............. 356/505
6,215,555 B1   4/2001  Chivers ..................... 356/450

* cited by examiner

Primary Examiner—Frank G. Font
Assistant Examiner—Michael P. Mooney
(74) Attorney, Agent, or Firm—Christopher C. Dremann

(57) ABSTRACT

The method and apparatus of the present invention is capable of precisely determining the orientation of the axis of the guide pin hole defined by a multifiber ferrule. Since the axis of the guide pin hole has a direct relationship to the alignment of the optical fibers, the method and apparatus can also precisely determine the end face angle of the ferrule based upon the axis of the guide pin hole without reference to external features of the ferrule. A measurement pin is initially positioned in a guide pin hole such that a first end of the measurement pin is disposed proximate the end face of the ferrule. The reference plane defined by the first end of the measurement pin is then measured, such as by an interferometer. Based upon the reference plane and the predetermined angle between the reference plane and the axis of the guide pin hole, the method and apparatus can precisely determine the orientation of the axis of the guide pin hole. The method and apparatus can also measure a plane defined by at least a portion of the end face of the ferrule, such as a region of interest surrounding the optical fibers. Based upon an angular difference between the reference plane defined by the first end of the measurement pin and the plane defined by the end face of the ferrule, the method and apparatus can then precisely determine at least one end face angle.

24 Claims, 4 Drawing Sheets

METHOD AND APPARATUS FOR ANALYZING THE END FACE OF A MULTIFIBER FERRULE

CROSS REFERENCE TO RELATED APPLICATION

This application is a divisional of U.S. patent application Ser No. 09/318,100, filed May 25, 1999, now U.S. Pat. No. 6,705,767.

FIELD OF THE INVENTION

The present invention relates generally to methods and apparatus for analyzing multifiber ferrules and, more particularly, to methods and apparatus for analyzing the end face of a multifiber ferrule.

BACKGROUND OF THE INVENTION

With the increasing proliferation of optical communications and data transfer, multifiber connectors are becoming increasingly prevalent for interconnecting a plurality of optical fibers. As such, a number of multifiber ferrules have been developed. For example, one multifiber ferrule is the MT family of ferrules that has a generally rectangular shape in lateral cross-section. Another multifiber ferrule is the SC-DC ferrule that has a generally circular shape in lateral cross-section and is supplied by Siecor Corporation of Hickory, N.C., the assignee of the present invention.

In order to interconnect a plurality of optical fibers with a minimum amount of attenuation, a pair of multifiber connectors are preferably mated such that the optical fibers are biased into contact with one another. In order to provide proper fiber-to-fiber contact, the multifiber connectors must be precisely aligned in order to correspondingly align the individual optical fibers in the connectors. This alignment is typically provided by guide pins that extend outwardly from the end face of a male multifiber ferrule for insertion into corresponding guide pin holes, grooves, or other structures defined by a female multifiber ferrule. In addition to precise alignment, the polish geometry of the ferrule and, in particular, the polish geometry of the end face of the ferrule is extremely important to insure proper fiber-to-fiber contact. In this regard, at least the portion of the end face of each ferrule that is proximate the bores through which the optical fibers extend (hereinafter the "optical fiber bores") is preferably polished to define a plane extending perpendicular to the axes defined by the guide pin holes and, therefore, perpendicular to the optical fiber bores. In addition, the planar surface defined by the portion of the end face of each ferrule proximate the optical fiber bores is preferably precisely positioned relative to the ends of the optical fibers. For example, with proper polish geometry, the fibers will extend by a predetermined distance beyond the end face of the ferrule such that fiber-to-fiber contact can be established. If, however, the polished geometry is not precisely defined, fiber-to-fiber contact may be prevented or otherwise obstructed by contact between those portions of the end faces of the ferrules that extend beyond the ends of the optical fibers.

In order to monitor the polish geometry and the resulting quality of the ferrules, it is desirable to determine the planarity of the end face of the ferrule and the angle of the end face relative to the optical fibers upon which the ferrule is mounted. As such, exterior surfaces of the ferrule have typically been utilized as a point of reference. In this regard, the shoulder defined by the enlarged rear portion of an MT ferrule is typically utilized as a point of reference relative to the end face of the respective ferrule. One inspection technique therefore determines the planarity of the end face and the angle of the end face relative to a point of reference defined by the shoulder of the ferrule. Unfortunately, the exterior surfaces of a ferrule and, in particular, the shoulder defined by an MT ferrule is a secondary datum and has no direct relationship to the alignment or the orientation of the optical fibers. For example, the end face may be properly positioned with respect to the shoulder of the ferrule even though the end face is improperly positioned relative to the optical fibers. Likewise, the end face may be improperly positioned relative to the shoulder even through the end face is properly positioned with respect to the optical fibers. Moreover, the connector industry is gravitating toward fully preassembled connectors in which the exterior surfaces that are typically utilized for reference purposes, such as the shoulder of an MT ferrule, are inaccessible and are therefore unavailable for reference with respect to the polish geometry of the end face of the ferrule. Therefore, although techniques have previously been utilized in order to analyze the polish geometry of the end face of a ferrule, the precision with which fibers must be aligned and brought into contact and the increasing emphasis on the preassembly of connectors demand that new techniques for analyzing the polish geometry of the end face of ferrules and the resulting quality of the ferrules be developed.

SUMMARY OF THE INVENTION

The method and apparatus of the present invention is therefore capable of precisely determining the orientation of the axis of the guide pin hole defined by a ferrule, including a partially defined guide pin hole, i.e., a guide pin groove. Since the axis of the guide pin hole has a direct relationship to the alignment of the optical fibers, the axis of the guide pin hole is a primary datum. As such, the method and apparatus of the present invention can also precisely determine the end face angle of at least that portion of the end face of the ferrule that is proximate the optical fiber bores based upon the primary datum, i.e., the axis of the guide pin hole, without reference to secondary datum, i.e., external features of the ferrule.

According to the present invention, a measurement pin is initially positioned in a guide pin hole such that a first end of the measurement pin is disposed proximate the end face of the ferrule. As a result of the construction of the measurement pin and the relationship between the measurement pin and the guide pin hole, a reference plane defined by the first end of the measurement pin is disposed at a predetermined angle, such as 90°, with respect to the axis of the guide pin hole. The method and apparatus of the present invention then measures the reference plane defined by the first end of the measurement pin to thereby enable the orientation of the axis of the guide pin hole to be determined based upon the predetermined angle between the reference plane and the axis of the guide pin hole.

In addition to measuring the reference plane defined by the first end of the measurement pin, the method and apparatus of the present invention can also measure a plane defined by at least a portion of the end face of the ferrule. For a ferrule that defines a plurality of bores for receiving optical fibers, the method and apparatus of the present invention preferably measures a plane defined by a region of interest encompassing the plurality of bores. Based upon an angular difference between the reference plane defined by the first end of the measurement pin and the plane defined by the end face of the ferrule, the method and apparatus can precisely determine at least one end face angle.

Typically, the reference plane defined by the first end of the measurement pin defines a X, Y plane. As such, the determination of at least one end face angle preferably includes a determination of first and second end face angles. In this embodiment, the first end face angle is based upon the angular difference in the X direction between the reference plane defined by the first end of the measurement pin and the plane defined by the end face of the ferrule. Likewise, the second end face angle is based upon angular difference in the Y direction between the reference plane defined by the first end of the measurement pin and the plane defined by the end face of the ferrule. While the angular differences in the X and Y directions can be separately measured, the angular differences in the X and Y directions can be measured concurrently, if so desired.

The method and apparatus of the present invention can be utilized in conjunction with ferrules that completely define guide pin holes as well as ferrules that partially define guide pin holes. In addition, the method and apparatus of the present invention can utilize two or more measurement pins positioned within respective guide pin holes that cooperate to define the reference plane. In one embodiment in which the ferrule, such as an MT ferrule, completely defines a pair of guide pin holes, first and second measurement pins are inserted into respective guide pin holes such that the first end of each measurement pin is disposed proximate the end face of the ferrule. The method and apparatus of this embodiment of the present invention then measures the plane defined by the first end of each measurement pin and determines the average of the planes to define the reference plane. In another embodiment in which the ferrule, such as an SC-DC ferrule, partially defines a pair of guide pin holes in the form of a pair of grooves that extend lengthwise along the opposed side surfaces of the ferrule, the first and second measurement pins are initially positioned within each groove such that the first end of each measurement pin is proximate the end face of the ferrule. Thereafter, the measurement pins are secured within the respective grooves.

In order to efficiently determine the end face angle of a ferrule, the method and apparatus of the present invention is preferably automated. As such, the means for measuring the reference plane and the means for measuring the plane defined by at least a portion of the end face of the ferrule are typically selected from the group consisting of a interferometer and a profilometer. Additionally, the means for determining the end face angle generally includes a processor for automatically analyzing the data collected during the measurement of the reference plane defined by the first end of the measurement pin and the measurement of the plane defined by at least a portion of the end face of the ferrule.

By determining the orientation of the axis of a guide pin hole defined the ferrule based upon the reference plane defined by the first end of a measurement pin inserted within the guide pin hole, the method and apparatus of the present invention is able to determine an end face angle of the ferrule based upon a primary datum of the ferrule. That is, the method and apparatus of the present invention determines an end face angle of the ferrule based upon an element of the ferrule that serves to align the ferrule and, in turn, the optical fibers upon which the ferrule is mounted, thereby providing a more precise and reliable determination of the polish geometry, including the end face angle of the ferrule. In addition, by measuring the end face angle of a ferrule based upon a reference plane defined by a first end of the measurement pin, the method and apparatus of the present invention permits precise measurement of the end face angle following preassembly of the connector that renders most exterior surfaces of the ferrule inaccessible.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
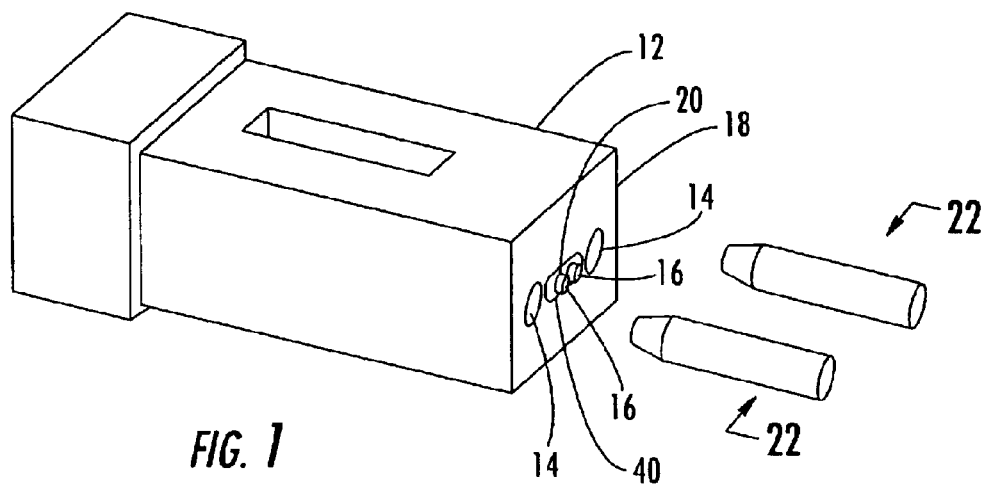
FIG. 1 is an exploded perspective view of a multifiber ferrule that defines a pair of guide pin holes as well as first and second measurement pins that are positioned so as to be inserted into the guide pin holes according to one embodiment of the present invention.
Figure 2:
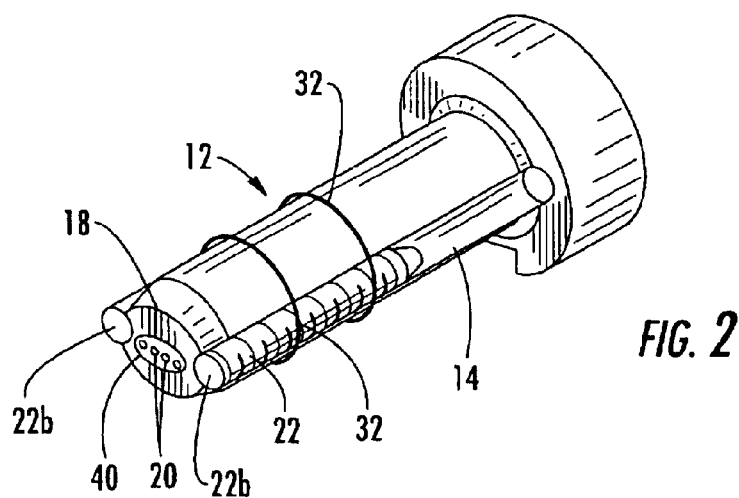
FIG. 2 is a perspective view of a generally cylindrical ferrule that defines a pair of grooves extending lengthwise along the opposed side surfaces of the ferrule in which measurement pins have been inserted and are secured according to another embodiment of the present invention.

Referring now to FIG. 1, a multifiber ferrule 12 is illustrated. As shown, the multifiber ferrule is an MT-type ferrule having a generally rectangular cross-sectional shape. As shown in FIG. 2, however, the method and apparatus of the present invention is applicable to other types of multifiber ferrules, such as an DC ferrule supplied by Siecor Corporation of Hickory, N.C., that has a generally circular cross-sectional shape.

Regardless of the type of ferrule 12, the multifiber ferrule defines at least one and, more typically, a pair of guide pin holes 14 for receiving respective guide pins. As known to those skilled in the art, guide pins are inserted into the guide pin holes for aligning a pair of multifiber ferrules and, more importantly, the optical fibers 16 upon which the multifiber ferrules are mounted. As shown in FIG. 1, the multifiber ferrule can completely define at least one and, more typically, a pair of guide pin holes that open through an end face 18 of the ferrule. Alternatively, the multifiber ferrule can partially define at least one, and more commonly, a pair of guide pin holes or other guide pin structures. As shown in FIG. 2, for example, the pair of guide pin holes defined by the multifiber ferrule of one advantageous embodiment includes a pair of grooves that extend lengthwise along opposed side surfaces of the ferrule. As used herein, therefore, guide pin holes may refer to fully defined guide pin holes as well as partially defined guide pin holes, i.e., guide pin grooves or other guide pin structures.

In addition to the guide pin holes 14 defined by the ferrule 12, the multifiber ferrule also defines a plurality of bores 20 through which respective optical fibers 16 extend. Typically, a multifiber ferrule defines 2, 4, 8, or more optical bores. However, a multifiber ferrule can define any number of optical fiber bores without departing from the spirit and scope of the present invention.

To ensure good contact at the ferrule end face, the end face 18 should be polished perpendicular to an axis along the bores 20. However, the axis of the bores 20 is difficult, if not impossible, to determine-especially after fibers are secured therein. Guide pin holes 14 are parallel to the bores 20—since the guide pin holes and the guide pins are used to align the ferrules and particularly the fibers. Since the guide pin holes are larger, their axes are easier to determine. As a result, if an axis of one of the guide pin holes can be translated to an accessible plane (i.e., a plane parallel to the ferrule end face), then the polished ferrule end can be compared to that plane. Since the guide pins holes are known to be parallel to the bores, the relationship of the end face to the bores is known and can be controlled.

One way to analyze and control the polish geometry of the end face 18 and the resulting quality of the ferrule 12 according to the present invention is to position a measurement pin 22 in a guide pin hole 14 defined by the multifiber ferrule. More typically, a respective measurement pin is positioned in each guide pin hole defined by the multifiber ferrule. As shown in FIGS. 1 and 2, for example, first and second measurement pins can be positioned in the pair of guide pin holes defined by the multifiber ferrules.

Figure 3:
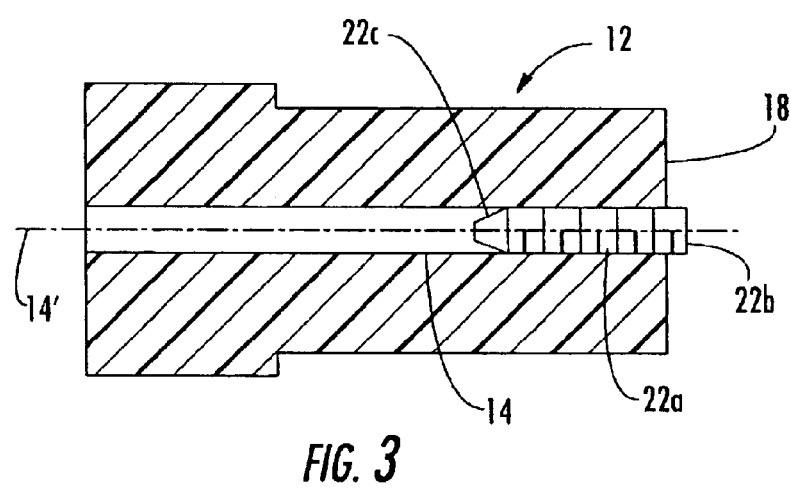
FIG. 3 is a cross-sectional view of the ferrule and one of the measurement pins of FIG. 1 that illustrates the manner in which the measurement pin is received within the respective guide pin hole.

Although the measurement pins 22 can be constructed of a variety of materials, the measurement pins are typically formed of a ferrous material, such as stainless steel. Regardless of the material from which the measurement pins are formed, each measurement pin generally includes an elongate body 22a extending between opposed first and second ends as shown in FIG. 3. In this regard, the first end 22b of the measurement pin that is visible at the end face 18 of the ferrule 12 is planar and defines a reference plane. In contrast, the second end 22c of the measurement pin that is inserted into the guide pin hole 14 is generally tapered or otherwise reduced in size relative to the elongate body of the measurement pin to facilitate insertion of the measurement pin into the guide pin hole.

As shown in FIG. 3, the elongate body 22a of the measurement pin 22 preferably has a shape and size that closely match the shape and size of the guide pin hole 14. In most instances in which the guide pin hole is cylindrical, the measurement pin is also cylindrical. In addition, the size of the elongate body of the measurement pin should closely approximate the size of the guide pin hole such that the measurement pin snugly fits within the guide pin hole. In this regard, measurement pins having a diameter that is about one micron smaller than the diameter of the corresponding guide pin hole have been found to work successfully. While the elongate body of the measurement pin can have various lengths, the elongate body of one advantageous measurement pin has a length, such as 3 mm, that is substantially equal to the length of the guide pin that will eventually be inserted into the guide pin hole. As such, the measurement pin of this advantageous embodiment can even more closely approximate the manner in which the guide pin will be held by the guide pin hole.

As a result of the close correspondence in shape and size of the measurement pin 22 to the guide pin hole 14, the axis defined by the measurement pin therefore extends colinearly with the axis 14' defined by the guide pin hole as shown in FIG. 3. Since the measurement pin is precisely formed such that the reference plane defined by the first end 22b of the measurement pin defines a predetermined angle with respect to the axis of the measurement pin, the reference plane also defines the same predetermined angle with respect to the axis of the guide pin hole. Furthermore, with the first end of the measurement pin precisely at the desired angle with respect to the axis of the guide pin hole, the first end of the measurement pin automatically translates the guide pin hole axis to an accessible plane—one parallel to the ferrule endface. While the reference plane defined by the first end of the measurement pin can define a variety of predetermined angles with respect to the axis of the measurement pin, the first end of the measurement pin typically defines a reference plane that extends perpendicular to the axis defined by the measurement pin. As such, the reference plane defined by the first end of the measurement pin also generally extends perpendicular to the axis defined by the respective guide pin hole once the measurement pin has been inserted into the guide pin hole.

In instances in which the multifiber ferrule 12 completely defines the guide pin holes 14, the measurement pin 22 is simply inserted into the corresponding guide pin hole, which snugly receives the measurement pin as shown in FIGS. 1 and 3. In instances in which the multifiber ferrule only partially defines the guide pin holes, as shown in FIG. 2, the measurement pins must generally be secured within the guide pin holes after the guide pin holes have been approximately positioned therein. For instance, in embodiments in which the guide pin holes include a pair of grooves that extend lengthwise along opposed side surfaces of the ferrule, the measurement pins are secured within the respective grooves, such as by means of a sleeve, an elastic element 32 or the like that fits about the multifiber ferrule and the measurement pins and that closely conforms to the shape thereof in order to securely hold the measurement pins within the respective grooves defined by the multifiber ferrule.

Regardless of the manner in which the guide pin holes 14 are defined, the measurement pin 22 is preferably positioned within the respective guide pin hole such that the first end 22b of the measurement pin is exposed through the end face 18 of the ferrule 12. Preferably, the measurement pin is positioned within the respective guide pin hole such that the first end of the measurement pin is flush with adjacent portions of the end face of the ferrule. For example, the measurement pin can be inserted into the respective guide pin hole and thereafter seated flush with the surrounding portions of the end face of the ferrule with a clean gage block. However, the measurement pin can be positioned within the respective guide pin hole such that the first end of the measurement pin protrudes somewhat beyond the surrounding portions of the end face of the ferrule in order to facilitate the subsequent removal of the measurement pin without departing from the spirit and scope of the present invention.

The measurement pins 22 can be readily positioned within the respective guide pin holes 14 by hand. Alternatively, the measurement pins can be held by a magnet, i.e., a high power electromagnet or a permanent magnet, that positions the measurement pins within the respective guide pin holes. As such, the measurement pins can be inserted into and removed from the guide pin holes without ever handling the measurement pins. Once the measurement pins have been positioned within the corresponding guide pin holes, the first end 22b of each measurement pin is generally cleaned with alcohol and is then blown dry with clean air or compressed gas.

Once the measurement pins 22 have been inserted into the respective guide pin holes 14 and the first ends 22b of the measurement pins have been cleaned, the reference plane defined by the first end of each measurement pin is measured. As such, the apparatus 30 of the present invention includes means for measuring a reference plane defined by the first end of the respective measurement pin that, in turn, is disposed at a predetermined angle with respect to the axes 14' of the measurement pin and the respective guide pin hole. According to one advantageous embodiment that will be described in more detail hereinbelow, the means for measuring the reference plane defined by the first end of the measurement pin comprises an interferometer 34, such as a vertical scanning interferometer supplied by Veeco Instruments, Inc. of Tucson, Ariz., or a phase shift interferometer provided by Zygo of Middlefield, Conn. However, the means for measuring the reference plane defined by the first end of the measurement pin can include other precision measurement instruments, such as a profilometer or the like, without departing from the spirit and scope of the present invention.

In embodiments in which the reference plane is measured with an interferometer 34, the multifiber ferrule 12 is placed in the fixture associated with the interferometer. See block 50 of FIG. 5. Measurement pins 22 are then positioned in each guide pin hole 14 as described above and as shown in block 52. After leveling the multifiber ferrule in the fixture, the interferometer then obtains a data set that includes data representative of the first end 22b of each measurement pin. See block 54. In instances in which only a single measurement pin is utilized, the interferometer obtains a data set that includes data representative of the first end of the measurement pin. Based upon a least squares fit of the data representative of the first end of the measurement pin, the reference plane defined by the first end of the measurement pin is then determined. See block 56. In instances in which a pair of measurement pins are inserted into corresponding guide pin holes, the data set includes data representative of the first ends of each measurement pin. Based upon the data collected by the interferometer, the plane defined by the first end of each measurement pin is then determined. By averaging the planes defined by the first ends of each measurement pin, the reference plane can be defined. For example, the planes defined by the first ends of each measurement pin can be averaged by translating one or both planes in the X-Y plane as well as the Z direction, i.e., generally perpendicular to the end face of the ferrule, such that the planes overlie one another and are positioned the same distance from the end face of the ferrule. After the planes have been translated in the X-Y plane and in the Z direction, the reference plane can be defined by the average of the translated planes.

Figure 4:
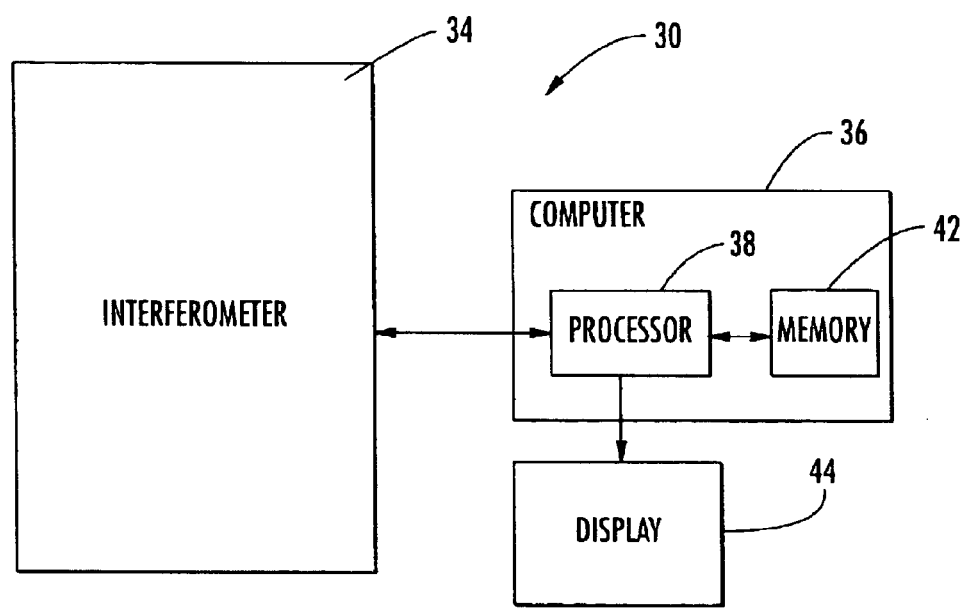
FIG. 4 is a block diagram of an apparatus according to one embodiment of the present invention.

In addition to an interferometer, a profilometer, or the like, the apparatus 30 of the present invention generally includes a computer 36, including a processor 38 operating under software control as shown in FIG. 4 for receiving the data collected by the interferometer, the profilometer, or the like and for analyzing the data, such as by performing a least squares fit analysis to determine the reference plane defined by the first ends 22b of the measurement pins 22. However, the apparatus can include other devices for appropriately processing the data that has been collected including application specific integrated circuits and other digital circuitry.

Based upon the reference plane measured by the method and apparatus of the present invention, the orientation of the axis 14' of the respective guide pin holes 14 can be determined. In this regard, the orientation of the axis of the respective guide pin holes is determined based upon the reference plane and the predetermined angle, such as 90°, defined between the reference plane and the axis of the guide pin hole. Once the orientation of the axis of the guide pin hole has been determined, the axis can be utilized as a reference point relative to other features of the ferrule 12, such as the end face 18 of the ferrule. In contrast to prior techniques that utilized the exterior surfaces of the ferrule as a reference point relative to the end face of the ferrule, the axis of the respective guide pin hole should provide greater precision as a reference point based upon the direct relationship of the guide pin hole to the eventual alignment of the optical fibers that is established by the insertion of a guide pin into the guide pin hole during the interconnection of a pair of fiber optic connectors. As known to those skilled in the art, the guide pins serve to align the multifiber ferrules and, in turn, the optical fibers 16 upon which the multifiber ferrules are mounted.

In addition to measuring the reference plane, the method and apparatus of the present invention can also measure a plane defined by at least a portion of the end face 18 of the ferrule 12. As such, the apparatus 30 of the present invention also includes means, typically embodied by the interferometer, the profilometer, or the like, for measuring the plane defined by at least a portion of the end face of the ferrule. While the method and apparatus of the present invention can measure the plane defined by the entire end face of the ferrule, a region of interest 40 that is centered about and encompasses the plurality of bores 20 through which the optical fibers 16 extend is generally identified, since this region of interest is typically of most importance with respect to obtaining the precise fiber-to-fiber contact that is desired. In the illustrated embodiments of the ferrules that define a plurality of linearly arranged bores through which the optical fibers extend, the region of interest is generally an elongated region that encompasses the plurality of bores and that has a major axis that passes through the centerlines of the bores, as shown by dashed lines in FIGS. 1 and 2.

Figure 5:
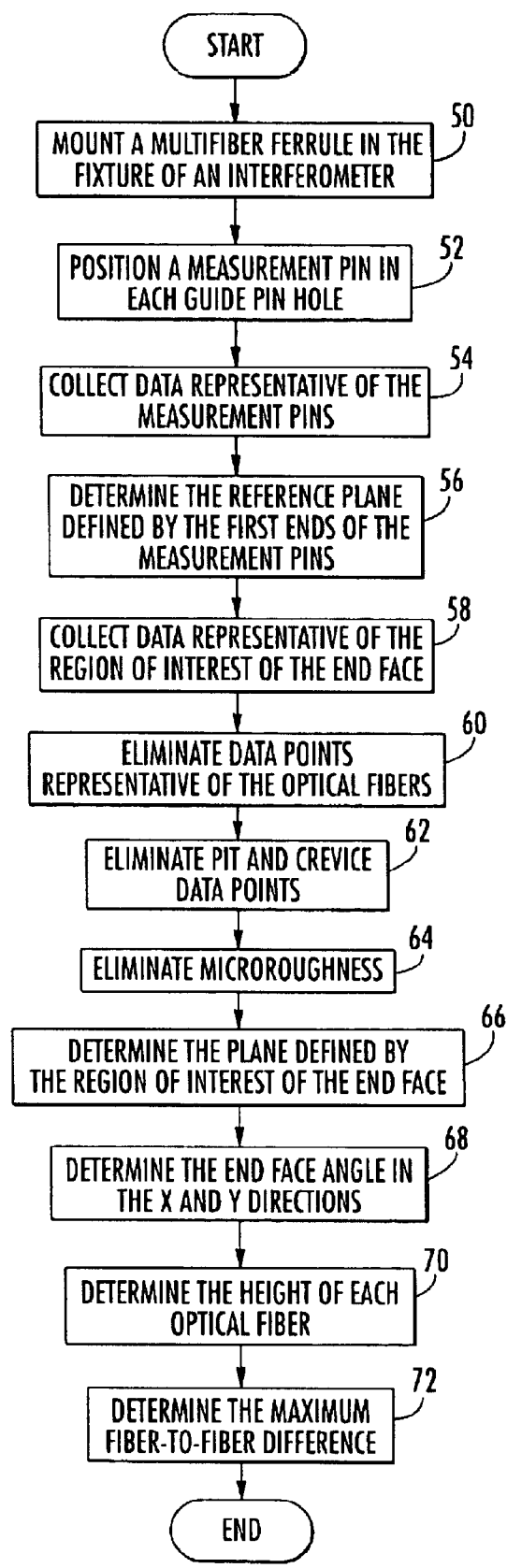
FIG. 5 is a flow chart illustrating the operations performed according to the method and apparatus of one advantageous embodiment to the present invention.

In the above-described embodiment in which the ferrule 12 is mounted within the fixture of the interferometer 34, the interferometer can also obtain a data set representative of the region of interest 40 of the end face 18 of the ferrule, as shown in block 58 of FIG. 5. In order to more precisely define the plane defined by the region of interest, the data collected by the interferometer that corresponds to the bores 20 through which the optical fibers 16 extend is removed or blanked. See block 60. In addition, the data points corresponding to the lowest elevations, i.e., the pit and crevice data points, can also be eliminated since these data points otherwise provide the highest degree of variability and are the least important when mating a pair of multifiber connectors. See block 62. While a variety of techniques can be utilized for determining the number of data points that are to be eliminated, the data set that results following elimination of the pit and crevice data points and the data points corresponding to the optical fiber bores preferably defines a cumulative pixel area that is greater than a predetermined threshold value. Typically, the predetermined threshold value is based upon the size and shape of the end face of the ferrule and, more particularly, the region of interest. For a large MT ferrule having a region of interest that is 3.5 mm×1.0 mm, for example, the cumulative pixel area remaining following elimination of the pit and crevice data points and data points corresponding to the optical fiber bores is preferably at least 0.6 mm$^2$. In contrast, for a small MT having a region of interest of 1.25 mm×1.0 mm or a SC-DC ferrule having a region of interest having a diameter of 1 mm, the cumulative pixel area is preferably at least 0.1 mm$^2$.

Figure 6A:
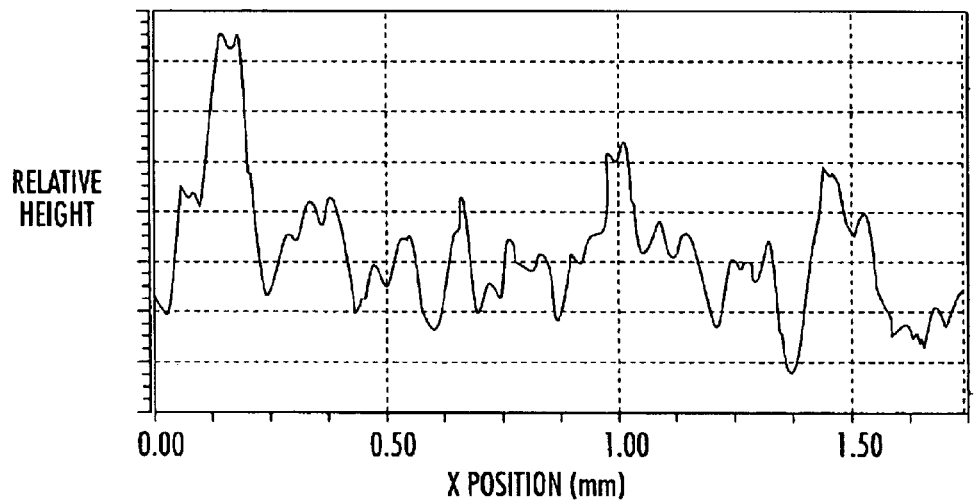
FIGS. 6A and 6B are diagrams illustrating exemplary profiles of a region of interest of an end face of a ferrule in the X and Y directions, respectively.
Figure 6B:
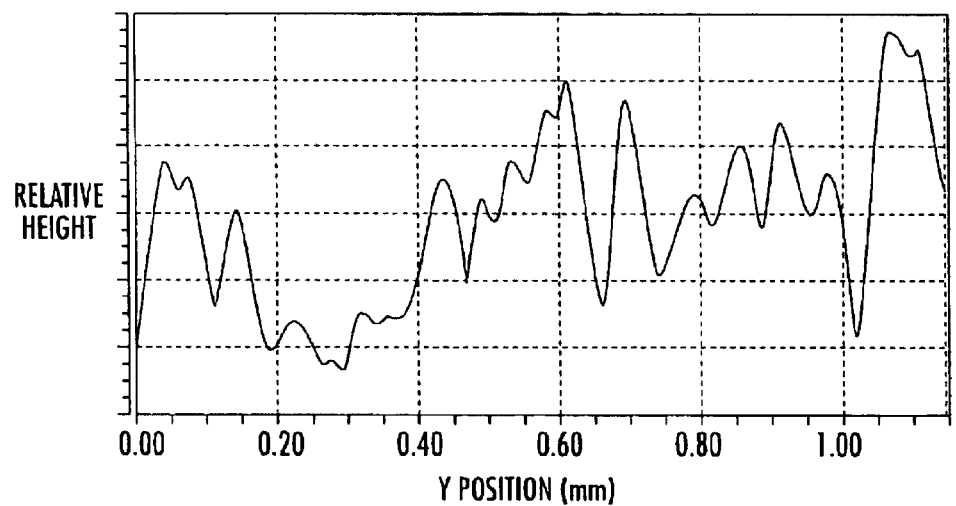

By way of example, FIGS. 6A and 6B illustrate exemplary profiles of a region of interest 40 of an end face 18 of a ferrule 12 in two mutually perpendicular directions, thereby constituting at least a portion of the data set collected during the measurement of the plane defined by the region of interest. In particular, FIG. 6A illustrates a profile taken along the major axis extending between the axes 14' defined by the guide pin holes 14, while FIG. 6B illustrates a profile taken along an axis perpendicular to the major axis. In each figure, the horizontal axis represents a relative position on the end face of the ferrule and the vertical axis represents the relative height of the end face at the respective position. Although FIGS. 6A and 6B illustrate two exemplary profiles, the method and apparatus of the present invention typically obtains a plurality of profiles in the course of measuring the plane defined by the region of interest of the end face of the ferrule.

As described above, a computer 36 including a processor 38 operating under software control generally receives the data that has been collected, such as by the interferometer 34, and eliminates the pit and crevice data points, i.e., the valleys in FIGS. 6A and 6B, and the data points corresponding to the optical fiber bores. After determining that the remaining data points define an area that is greater than the threshold value, the computer filters the data set to remove microroughness that is typically the result of relatively high frequency noise. See block 64. After eliminating the pit and crevice data points and removing the microroughness, the resulting data set preferably includes data points that correspond to respective heights that vary by no more than a preset value, such as 1 micron in one example. Thereafter, the computer fits a plane, such as by means of a least squares fit, to the remaining data points. See block 66. The plane that is fit to the remaining data points is therefore determined to be the plane defined by the region of interest 40 of the end face 18 of the ferrule 12.

Once the method and apparatus of the present invention has measured the reference plane and a plane defined by at least a portion of the end face 18 of the ferrule 12, the method and apparatus of the present invention determines at least one end face angle based upon an angular difference between the reference plane and the plane defined by the end face of the ferrule. As such, the apparatus 30 of the present invention includes means, such as the computer 36 that includes a processor 38 or the like, for determining at least the one end face angle based upon the reference plane and the plane defined by the end face of the ferrule. See block 68 of FIG. 5. In the typical embodiment in which the reference plane defines an X, Y plane, a first end face angle can be determined based upon the angular difference in the X direction between the reference plane defined by the first end of the measurement pin 22 and the plane defined by the end face of the ferrule. Likewise, a second end face angle based upon the angular difference in the Y direction between the reference plane defined by the first end of the measurement pin and the plane defined by the end face of the ferrule can also be determined. While the first and second end face angles can be separately determined, the first and second end face angles can be determined concurrently, if so desired. Once the end face angles have been determined, the end face angles can be stored, such as within memory element 42, and/or displayed upon display 44.

In addition to determining the end face angles in the X and Y directions between the reference plane and the plane defined by the end face 18 of the ferrule 12, the method and apparatus of the present invention can also determine the height of each optical fiber 16 relative to at least a portion of the end face and, more particularly, relative to the region of interest 40 surrounding the optical fiber bores 20. See block 70. By determining the relative height of the fibers with respect to the end face, the method and apparatus of the present invention can determine the maximum difference in height between all of the fibers and the maximum fiber-to-fiber height differential. See block 72. As such, the method and apparatus of the present invention can be utilized to further characterize and qualify the multifiber ferrule 12 in a precise and repeatable manner.

By determining the orientation of the axis 14' of a guide pin hole 14 defined the ferrule 12 based upon the reference plane defined by the first end 22b of measurement pin 22 inserted within the guide pin hole, the method and apparatus of the present invention is able to determine an end face angle of the ferrule based upon a primary datum of the ferrule. That is, the method and apparatus of the present invention determines an end face angle of the ferrule based upon an element of the ferrule that serves to align the ferrule and, in turn, the optical fibers 16 upon which the ferrule is mounted, thereby providing a more precise and reliable determination of the polish geometry, including the end face angle of the ferrule. In addition, even though the method and apparatus of the present invention is illustrated in FIGS. 1 and 2 in conjunction with a multifiber ferrule prior to assembly, the method and apparatus of the present invention is particularly capable of analyzing the end face of a ferrule following the preassembly of the ferrule into a multifiber connector. In this regard, by measuring the end face angle of a ferrule based upon a reference plane defined by a first end of the measurement pin, the method and apparatus of the present invention permits precise measurement of the end face angle following preassembly of a multifiber connector that renders most exterior surfaces of the ferrule inaccessible.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for determining an end face angle of a ferrule having a measurement pin disposed within a guide pin hole defined by the ferrule, the method comprising:
measuring a reference plane defined by a first end face of the measurement pin that is disposed proximate an end face of the ferrule, wherein the first end face of the measurement pin is disposed at a predetermined angle with respect to an axis of the guide pin hole; measuring a plane defined by at least a portion of an end face of the ferrule; and determining at least one end face angle based upon an angular difference between the reference plane defined by the first end face of the measurement pin and the plane defined by the at least a portion of the end face of the ferrule, said determining step following both said measuring steps.

2. The method according to claim 1 wherein the ferrule defines a plurality of bores for receiving optical fibers, and wherein said step of measuring a plane defined by the at least a portion of the end face of the ferrule comprises measuring a plane defined by a region of interest encompassing the plurality of bores.

3. The method according to claim 1 wherein the reference plane defines an X, Y plane to thereby establish an X direction and a Y direction, and wherein said determining step comprises:

determining a first end face angle based upon the angular difference in the X direction between the reference plane defined by the first end face of the measurement pin and the plane defined by the at least a portion of the end face of the ferrule; and determining a second end face angle based upon the angular difference in the Y direction between the reference plane defined by the first end face of the measurement pin and the plane defined by the at least a portion of the end face of the ferrule.

4. The method according to claim 1 wherein the ferrule defines a pair of guide pin holes, and wherein the method further comprises the step of inserting first and second measurement pins into respective guide pin holes such that the first end face of each measurement pin is disposed proximate the end face of the ferrule.

5. The method according to claim 4 wherein said step of measuring the reference plane comprises:

measuring the plane defined by the first end face of each measurement pin; and determining an average of the planes defined by the first end faces of the first and second measurement pins to thereby define the reference plane.

6. The method according to claim 4 wherein said inserting step comprises inserting the first and second measurement pins such that the first end face of each measurement pin is flush with the end face of the ferrule.

7. The method according to claim 4 wherein the pair of guide pin holes comprise a pair of grooves that extend lengthwise along opposed side surfaces of the ferrule, and wherein said inserting step comprises:

positioning a measurement pin within each groove; and securing the measurement pins within the respective grooves prior to said measuring steps.

8. A method for defining an orientation of an axis of a guide pin hole defined by a ferrule and opening through an end face of the ferrule, the method comprising:

positioning a measurement pin in the guide pin hole such that a first end face of the measurement pin is disposed proximate the end face of the ferrule, wherein said positioning step comprises positioning the measurement pin such that a reference plane defined by the first end face of the measurement pin is disposed at a predetermined angle with respect to the axis of the guide pin hole; and measuring the reference plane defined by the first end face of the measurement pin following said positioning step to thereby enable the orientation of the axis of the guide pin hole to be determined therefrom.

9. The method according to claim 8 wherein the ferrule defines a pair of guide pin holes, and wherein said positioning step comprises inserting first and second measurement pins into respective guide pin holes such that the first end face of each measurement pin is disposed proximate the end face of the ferrule.

10. The method according to claim 9 wherein said measuring step comprises:

measuring the reference plane defined by the first end face of each measurement pin; and determining an average of the reference planes defined by the first end faces of the first and second measurement pins to thereby enable the orientation of the axis of the guide pin hole to be determined therefrom.

11. The method according to claim 8 wherein said positioning step comprises positioning the measurement pin such that the first end face is flush with the end face of the ferrule.

12. The method according to claim 8 wherein the guide pin hole is a groove that extends lengthwise along a side surface of the ferrule, and wherein said positioning step comprises:

positioning the measurement pin within the groove; and securing the measurement pin within the groove prior to said measuring step.

13. A method for determining an end face angle of a ferrule with a guide pin hole defined by the ferrule, the method comprising:

determining a reference plane, the reference plane disposed at a predetermined angle with respect to an axis of the guide pin hole;

measuring a plane defined by at least a portion of an end face of the ferrule; and determining at least one end face angle based upon an angular difference between the reference plane and the plane defined by the at least a portion of the end face of the ferrule.

14. A method for determining the height of at least one optical fiber of a ferrule relative to a plane defined by the ferrule, the ferrule comprising an end face defining at least one bore through which an end of the optical fiber extends, the bore defining an axis, the method comprising:

measuring a reference plane disposed proximate an end face of the ferrule at a predetermined angle with respect to the axis defined by the bore;

measuring the plane defined by the ferrule;

measuring a plane defined by the end of the optical fiber;

at the location of the optical fiber, determining a linear difference in the direction of the axis defined by the bore between the reference plane and the plane defined by the ferrule;

at the location of the optical fiber, determining a linear difference in the direction of the axis defined by the bore between the reference plane and the end of the optical fiber; and determining the height of the optical fiber relative to the plane defined by the ferrule by comparing the linear difference between the reference plane and the plane defined by the ferrule to the linear difference between the reference plane and the end of the optical fiber.

15. The method according to claim 14 wherein the plane defined by the ferrule is a plane defined by at least a portion of the end face of the ferrule proximate the optical fiber.

16. The method according to claim 14 wherein the end face of the ferrule defines a plurality of bores through which a respective one of a corresponding plurality of optical fibers extends and wherein the height of each optical fiber is determined relative to the plane defined by the ferrule.

17. The method according to claim 16 further comprising determining the maximum difference in height between the plurality of optical fibers by comparing the height of each optical fiber relative to the plane defined by the ferrule to the height of each of the other optical fibers relative to the plane defined by the ferrule.

18. The method according to claim 16 further comprising determining the maximum fiber-to-fiber height differential between the plurality of optical fibers by comparing the height of each optical fiber relative to the plane defined by the ferrule to the height of each adjacent optical fiber relative to the plane defined by the ferrule.

19. The method according to claim 14 wherein the ferrule has at least one guide pin hole defining an axis that is parallel to the axis defined by the bore and wherein the reference plane is disposed at a predetermined angle with respect to the axis defined by the guide pin hole.

20. The method according to claim 19 wherein a measurement pin having a first end is disposed within the guide pin hole and wherein the reference plane is defined by the first end of the measurement pin.

21. The method according to claim 20 wherein the plane defined by the ferrule is a plane defined by at least a portion of the end face of the ferrule proximate the optical fiber.

22. The method according to claim 21 wherein the end face of the ferrule defines a plurality of bores through which a respective one of a corresponding plurality of optical fibers extends and wherein the height of each optical fiber is determined relative to the plane defined by the ferrule.

23. The method according to claim 22 further comprising determining the maximum difference in height between the plurality of optical fibers by comparing the height of each optical fiber relative to the plane defined by the ferrule to the height of each of the other optical fibers relative to the plane defined by the ferrule.

24. The method according to claim 22 further comprising determining the maximum fiber-to-fiber height differential between the plurality of optical fibers by comparing the height of each optical fiber relative to the plane defined by the ferrule to the height of each adjacent optical fiber relative to the plane defined by the ferrule.

* * * * *